June 7, 1932.     C. A. ANDERSON     1,861,996
SPRAY GUN
Filed Nov. 3, 1928
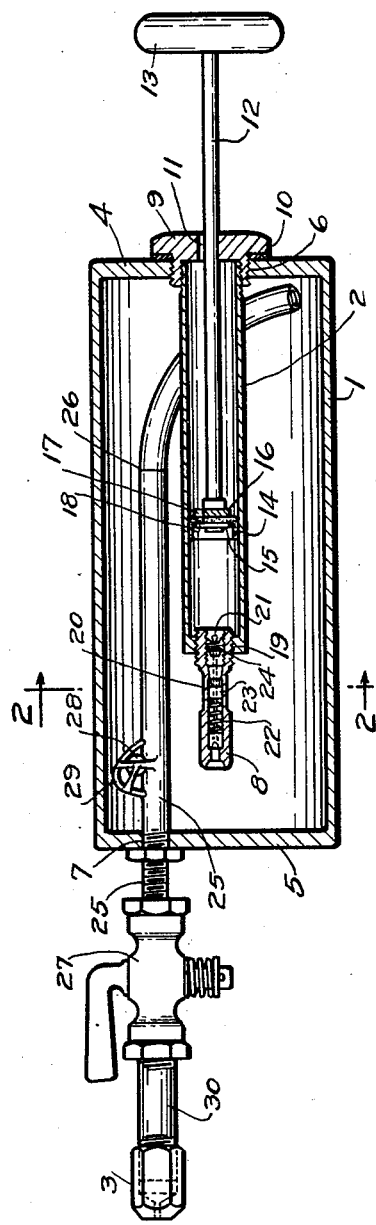
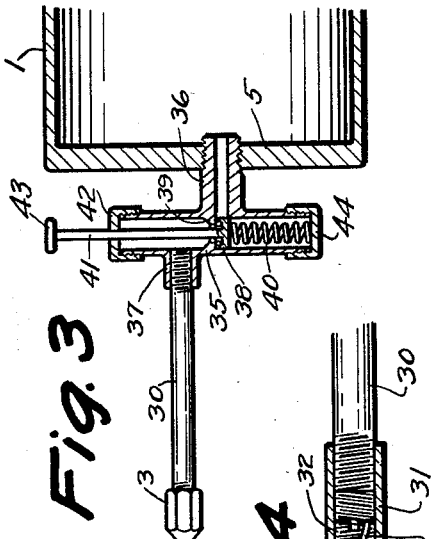
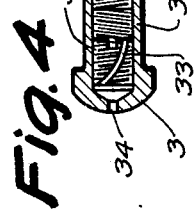
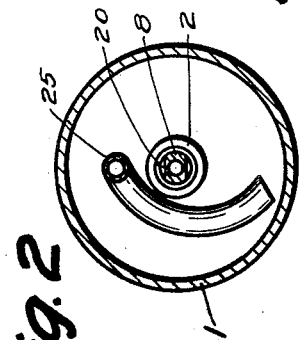
INVENTOR
*Charles A. Anderson*
BY
*Harry Bowen*
ATTORNEY Patented June 7, 1932

1,861,996

UNITED STATES PATENT OFFICE

CHARLES A. ANDERSON, OF SEATTLE, WASHINGTON

SPRAY GUN

Application filed November 3, 1928. Serial No. 316,912.

The invention is a spray device having a fluid container with a manually operated pump for creating a pressure therein and a spray nozzle extending from the end of the container with a valve between the container and nozzle.

The object of the invention is to provide means for spraying a fluid in comparatively inaccessible places.

Another object of the invention is to provide a spray device in which a pressure may be created within the device by hand.

A further object of the invention is to provide a spray device which is self-contained so that any desired pressure may readily be created in the device.

A still further object of the invention is to provide a spray device which will spray a liquid under pressure with the device in any position.

And a still further object of the invention is to provide a spray device which is of a simple and economical construction.

With these ends in view the invention embodies, a container, a hand operated pump in the container and adaptable to create a pressure therein, and a spray nozzle extending from the end of the container with a valve between the end of the nozzle and the container.

Other features and advantages of the invention will appear from the following description, taken in connection with the drawing, wherein:—

Figure 1 is a view showing a longitudinal section through the container and pump.

Figure 2 is a cross section through the container on line 2—2 of Figure 1.

Figure 3 is a view showing a section at the end of the container with a valve of an alternate design.

Figure 4 is a cross section through the spray nozzle showing one method of forming the nozzle.

In the drawing the device is shown as it would be made, wherein numeral 1 indicates the container, numeral 2 the pump, and numeral 3 the nozzle.

The container 1 may be made as shown of a cylindrical casing with the ends 4 and 5 sealed as shown. At one end of the casing is a threaded opening 6 in which the pump is located and at the opposite end is another threaded opening 7 in which the spray nozzle is placed. It will be understood that while the container is shown as being of a cylindrical shape and arranged in this manner it may be made of any suitable shape and arranged in any suitable manner.

The pump 2 is also made with a cylindrical casing which is indicated by the numeral 2 and at one end of this casing is a valve 8 which is similar to the valve of an inner tube of a motor vehicle tire and at the opposite end is a nut 9 which is screwed upon the outside of the open end of the casing 2 and also screwed into the opening 6 in the end of the casing 1 with a packing ring 10 between the head of the nut and the end of the casing to form a positive seal.

The nut 9 has an opening 11 in the center thereof and a stem 12 with a handle 13 on the outer end is slidably mounted in this opening. At the inner end of the stem 12 is the pump plunger which is formed with a cup shaped washer 14 held between washers 15 and 16 on the end of the stem. The washer 16 is provided with a notch 17 at one side which is positioned to cooperate with an opening 18 in the cup shaped washer; and the washer 15 is of a flexible material so that it will spring away from the opening to permit air to pass through the plunger as the plunger moves toward the outer end of the pump cylinder. It will be observed that as the plunger moves in the opposite direction the washer 15 will be held against the opening to form a closure by the pressure created in the pump.

The valve 8 is formed with a casing that may be indicated by the numeral 8 and one end of this casing is screwed into an opening 19 in the end of the pump cylinder 2 and the outer surface thereof is provided with flat sides, as indicated by the numeral 20, by which the valve casing may be gripped when it is desired to screw it into or out of the pump casing. The valve mechanism within the casing is similar to that of an inner tube or tire valve and is formed with a rod 21 having a spring 22 and a valve seat 23 thereon and all of which are held in place by a nut 24 which is screwed into the end of the casing. It will be understood that although this type of valve is shown any other suitable valve may be used.

The operating valve is mounted upon the outer end of a tube 25 which is inserted in the casing through the opening 6 and which is provided with a swivel joint at the point 26 so that it may be turned in the casing and it will be observed that one end will extend through the end 5 of the container and the operating valve which is indicated by the numeral 27 may be mounted upon this end of the tube. The tube may also be provided with an opening adjacent the end that is screwed into the end of the container and this opening may be closed by a ball 28 in a cage 29 when the container is in the position shown, or when it is held with the spray nozzle upward; and it will be observed that when it is used with the spray nozzle downward the ball 28 will roll to the opposite end of the cage 29 and permit fluid to enter the tube 25 at this end. It is understood that although this type of closure is shown and disclosed a closure of any other suitable type may be used. This device will make it possible to obtain a liquid through the spray nozzle with the container in any position, as it will be observed that the liquid in the container will flow to the lower end at all times and in order to make it possible to obtain a liquid through the spray nozzle with the spray nozzle extending either upward or downward it is necessary to provide an opening to the nozzle from both ends of the container. The nozzle 3 may be connected to the valve 27 by a nipple 30, as shown, and it is understood that the nozzle may be of any suitable type or design. The nozzle shown in Figure 4 may be used, however, it will be understood that a nut with a small opening in the outer end, as shown in Figure 1, may be used. The nozzle shown in Figure 4 is provided with a casing 31 which is screwed upon the nipple 30 and it will be observed that the casing 31 is provided with a nut 32 having spiral grooves 33 therein which will force the liquid to pass through the nozzle with a spiral movement so that as it passes out of the small opening 34 at the tip of the nozzle it will be atomized. It will also be understood that any other means may be used in the nozzle for atomizing the liquid.

The valve shown in Figure 3 is provided with a casing 35 having a nipple 36 that may be screwed into the end 5 of the container 1 at an eccentrically located point and a boss 37 into which the nipple 30 may be screwed. The tube 25, shown in Figure 1, may be attached to or may extend from the inner end of the nipple 36 to a point in the casing diagonally opposite the valve connection. The casing is provided with a valve 38 which is held against a seat 39 by a spring 40 and the valve is provided with a stem 41 that extends upward through a cap 42 at the upper end of the casing and the outer end of the stem may be provided with a button 43 by which it may be readily pressed downward to open the valve. The lower end of the casing may be provided with a cap 44 which will hold the spring. It will therefore be observed that the container 1 may be held in the hand and the spray operated or released as desired by pressing downward upon the botton 42 with the thumb or forefinger of the hand in which the container may be held. It will be understood that any other suitable valve may be used between the nozzle and the container and any other suitable means may be provided by which the valve may be operated.

It will be understood that changes may be made in the construction without departing from the spirit of the invention, one of which changes may be in the arrangement of the pump or nozzle in the container, another may be in the use of a pump of a different type or design, another may be in the placing of a nozzle in the container in any other position in relation to the position of the pump, and still another may be in the use of other means for supplying the liquid to the nozzle with the container in any position.

The construction will be readily understood from the foregoing description. In use the device may be supplied as shown in Figure 1 and it will be observed that by removing the pump the container may readily be filled or partly filled with a liquid through the pump opening and then the pump replaced. The pump may then be operated to create a pressure within the container and it will be observed that with the liquid in the container under pressure it will be forced out through the nozzle as soon as the valve between the container and nozzle is opened and by forcing the liquid out under pressure it may be sprayed with a very fine spray. It will be observed that as much pressure as may be desired may be created by the pump and whenever the pressure drops the pump may again be operated so that it will be possible to maintain a continuous pressure until the liquid is completely exhausted. The device may then be refilled and reused as often as desired. It will therefore be observed that this device is self-contained and may be used wherever desired.

Having thus fully described the invention, what I claim as new and desire to secure by Letters Patent, is:—

In a spray gun of the type having a cylindrical casing that may be held in the left hand with a plunger handle extending from one end that may be pushed inward and outward to create a pressure within the said casing, a cylinder extending into the casing from one end, a piston in the said cylinder with the stem extending beyond the end of the casing and upon which the handle which may be gripped by the right hand is mounted, a valve at the inner end of the said cylinder resembling a tire valve and which will open as the pressure is produced in the cylinder, a nozzle extending from the end of the casing opposite to that from which the said handle extends and eccentrically positioned in the said casing end, a valve between the said casing and nozzle, a connection extending from the said nozzle through the interior of the said casing around the said cylinder and to a point at the opposite end and diagonally opposite said nozzle connection, and a valve in the said connection adjacent the point where it is connected to said nozzle adapted to close when the casing is held in such a position that the nozzle is in the upper side thereof, and open when the nozzle is located in the lower side.

In testimony whereof I affix my signature.

CHARLES A. ANDERSON.